Patented Dec. 22, 1931

1,837,649

UNITED STATES PATENT OFFICE

ROBERT BERLINER, OF LEVERKUSEN-ON-THE-RHINE, GERMANY, ASSIGNOR TO GENERAL ANILINE WORKS, INC., OF NEW YORK, N. Y., A CORPORATION OF DELAWARE

NEW CARBAZOLE DERIVATIVES OF THE DIANTHRAQUINONYLAMINE-ACRIDONE SERIES

No Drawing. Application filed July 30, 1929, Serial No. 382,279, and in Germany August 7, 1928.

The present invention relates to a process of preparing carbazole derivatives of the dianthraquinonylamine-acridone series and to the new products obtainable thereby.

In accordance with the invention new vat dyestuffs of the probable general formula:

wherein the nuclei marked I and II may be substituted by halogen atoms, are obtainable by reacting upon the corresponding dianthraquinonylamine-acridone compounds with strong sulfuric acid at a temperature between about 10–40° C. until no more change in color occurs, and oxidizing the intermediate product thus formed either by prolonged heating of the sulfuric acid solution, or by means of an oxidizing agent, such as sodium nitrite.

The working up of the reaction mixture may be performed in the usual manner, for instance by pouring the melt into ice water, filtering and washing.

Oxidation may also be performed by adding the oxidizing agent, such as an alkali metal nitrite, chromic acid, or the like to ice water and then pouring the unoxidized sulfuric acid solution into the water.

The products thus obtainable form green powders soluble in strong sulfuric acid with a greenish-blue coloration, they are difficultly soluble in the usual organic solvents and dye cotton from a yellow-olive hydrosulphite vat clear and fast green shades.

The invention may be illustrated by the following examples, but is not restricted thereto.

Example 1

21 parts by weight of trichloroanthraquinone acridone of the probable formula

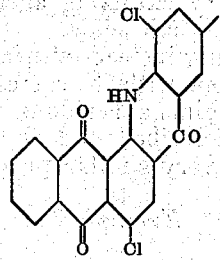

(obtainable, for instance, by chlorination of anthraquinone-N-1:2-acridone in nitrobenzone) and 20 parts by weight of 4-aminodichloroanthraquinone acridone are heated for several hours to boiling with 10 parts by weight of sodium acetate and one part by weight of cupric chloride in 500 parts by weight of naphthalene. The condensation product, which separates in well-formed, small, dark crystals, is worked up in the customary manner.

5 parts by weight of the dianthraquinone-acridonylamine are dissolved at about 20° C. in 50 parts by weight of concentrated sulfuric acid. The coloration of the solution, which is at first yellowish-brown, changes already after a short time to olive. When no further change occurs in the coloration of the solution, the melt is poured into 500 parts of water, to which 3 parts by weight of sodium nitrite have been added and heating is effected for half an hour at 70° C. The new dyestuff is thus obtained in the form of green flakes, which are filtered and washed. Instead of using the sodium nitrite dissolved in water, the calculated quantity of sodium nitrite can also be added to the sulfuric acid solution, whereupon the original olive coloration of the solution changes to a clear greenish-blue. The dyestuff dyes cotton from a yellowish-olive vat fast green shades and corresponds to the probable formula:

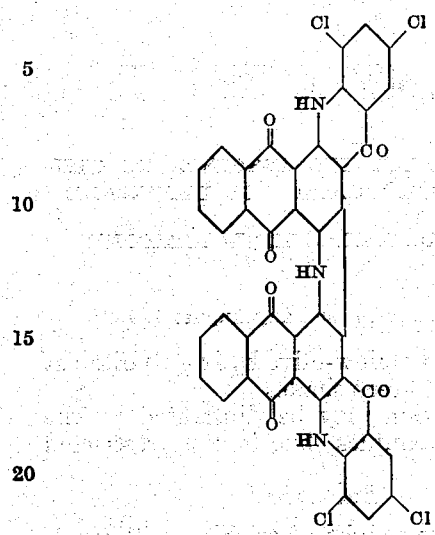

The oxidation can also be carried out with other customary oxidizing agents, such as, for instance, chromic acid.

When starting instead of trichloroanthraquinone acridone with the corresponding tribromoanthraquinone acridone and further working as described and this example a compound of very similar properties is obtained.

*Example 2*

5 parts by weight of the condensation product of 1 mol of trichloroanthraquinone acridone with 1 mol of 4-amino-anthraquinone acridone are dissolved at about 20–30° C. in 50 parts by weight of concentrated sulfuric acid and the reaction mixture is further treated as described in Example 1. A dyestuff is thus obtained possessing similar properties to that of Example 1, but dyeing cotton a slightly more yellowish-green shade.

I claim:—

1. The process which comprises reacting upon a compound of the general formula:

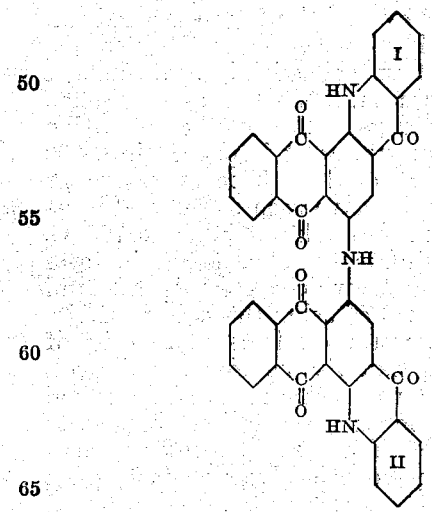

wherein the nuclei I and II may be substituted by halogen atoms, with strong sulfuric acid at a temperature between about 10–40° C. and oxidizing the intermediate product thus formed.

2. The process which comprises reacting upon a compound of the general formula

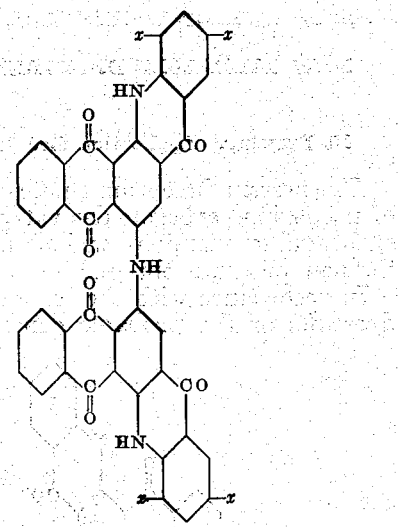

wherein the $x$'s stand for halogen atoms, with strong sulfuric acid at a temperature between about 10–40° C. and oxidizing the intermediate products thus obtained.

3. As new products, the compounds of the probable general formula

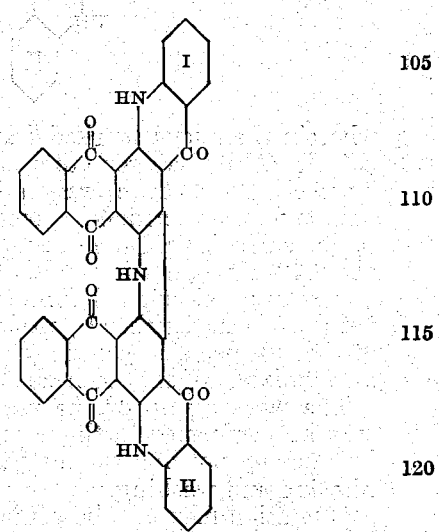

wherein the nuclei I and II may be substituted by halogen atoms, said products being green powders soluble in concentrated sulfuric acid with blueish-green colorations, dyeing cotton from an alkaline hydrosulfite vat clear and fast green shades.

4. As new products, the compounds of the probable general formula

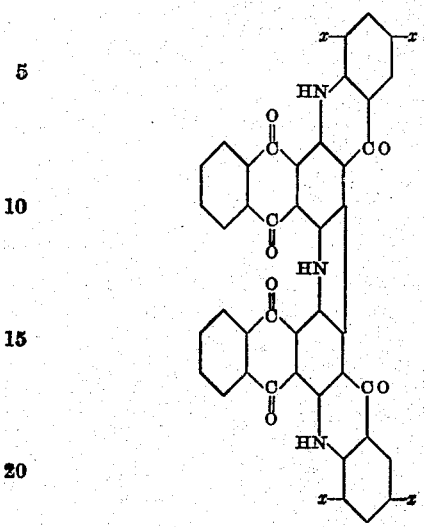

wherein the $x$'s stand for halogen atoms, said products being green powders, soluble in concentrated sulfuric acid with a greenish-blue coloration, dyeing cotton from an alkaline hydrosulfite vat, clear and fast green shades.

5. As a new product, the compound of the probable formula:

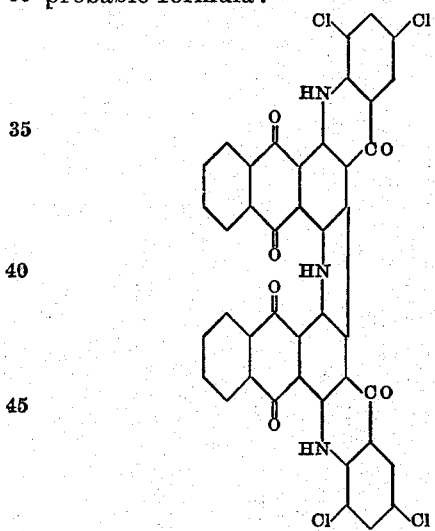

said compound forming a green powder, soluble in concentrated sulfuric acid with a greenish-blue coloration, dyeing cotton from a yellowish-olive vat fast green shades.

In testimony whereof, I affix my signature.

ROBERT BERLINER. [L. S.]